Figure 1:
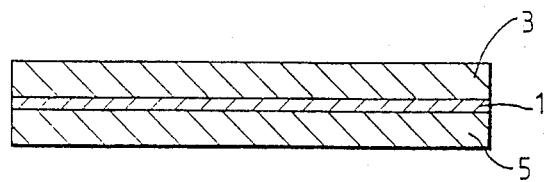

United States Patent [19]

Knight et al.

[11] Patent Number: 4,737,422

[45] Date of Patent: Apr. 12, 1988

[54] POLYMERIC ELECTROLYTES

[75] Inventors: John Knight, Farnborough; Colin Booth, Glossop; Richard H. Mobbs, Bramhall; John R. Owen, Manchester; Jeremy R. M. Giles, Worthing; John R. Craven, Manchester; Ian E. Kelly, London, all of England

[73] Assignee: The Secretary of State for Defence in Her Britannic Majesty's Government of the United Kingdom of Great Britain and Northern Ireland, London, England

[21] Appl. No.: 855,819

[22] PCT Filed: Aug. 21, 1985

[86] PCT No.: PCT/GB85/00376

§ 371 Date: Jun. 20, 1986

§ 102(e) Date: Jun. 20, 1986

[87] PCT Pub. No.: WO86/01643

PCT Pub. Date: Mar. 13, 1986

[30] Foreign Application Priority Data

Aug. 21, 1984 [GB] United Kingdom ................ 8421193
Aug. 21, 1984 [GB] United Kingdom ................ 8421194
Jan. 18, 1985 [GB] United Kingdom ................ 8501342

[51] Int. Cl.⁴ .................... H01M 6/18; H01M 10/40
[52] U.S. Cl. .................................. 429/192; 429/194
[58] Field of Search ........................... 429/192

[56] References Cited

U.S. PATENT DOCUMENTS

| 4,303,748 | 12/1981 | Armand et al. | 429/192 |
| 4,357,401 | 11/1982 | Andre et al. | 429/192 |
| 4,556,614 | 12/1985 | Mehaute et al. | 429/192 |
| 4,556,616 | 12/1985 | Armand et al. | 429/192 |
| 4,578,326 | 3/1986 | Armand et al. | 429/192 |

FOREIGN PATENT DOCUMENTS 0163576 5/1985 European Pat. Off. .
WO83/322 3/1986 PCT Int'l Appl. .

OTHER PUBLICATIONS

GTE, Molecular Crystals and Liquid Crystals, vol. 106, Nos. 3 and 4 (1984), Proceedings of the Symposium on Order in Polymeric Materials, Part B, pp. 361–369.

Primary Examiner—Donald L. Walton
Attorney, Agent, or Firm—Stevens, Davis, Miller & Mosher

[57] ABSTRACT

A polymeric electrolyte comprising a solution of an ionic salt in a polymer X having a bacbone of formula —A—B—, where A is an oligomeric chain and B is a chain extender group, attached to oligomer A, containing one or more linkage atoms Z selected from Si, C and P, wherein the polymer contains oxymethylene units which are present in one or more of the polymer backbone, sidechains or crosslinks, such that where A is an oxyethylene oligomer of formula $-(CH_2CH_2-O)_n$, n is an integer from 3 to 10 and where the oxyethylene oligomer is contained in a sidechain or crosslink attached at B, n is from 2 to 25.

19 Claims, 2 Drawing Sheets

POLYMERIC ELECTROLYTES

The present invention relates to polymeric electrolytes and their use in electrolytic cells and batteries containing such cells.

The electrolytes commonly used in electrolytic cells are liquids in the form of solutions containing ionic species, which allow migration of charged ions between the anode and the cathode of the cell. However, liquid electrolytes suffer from several disadvantages in that they are often corrosive or toxic and can be spilled which presents handling difficulties and necessitates precautions ensuring the avoidance of spillage or leakage.

In order to overcome the difficulties inherent with liquid electrolytes and to obtain superior long-term storage stability there has been considerable interest recently in solid polymeric electrolyte materials in which ion mobility is possible through coordination of an electrolyte ion with suitable sites on a polymer chain, such as for example polyethylene oxide (PEO), forming a polymeric complex. However the properties of such conventional complexed polymers, although encouraging, have not proved to be as good as had been hoped. In particular PEO tends to crystallise at ambient temperature (20° C.) and this adversely affects the ionic conductivity of the electrolyte.

The present invention seeks to overcome the disadvantages of known polymeric electrolytes based on PEO by providing novel polymeric electrolytes which have generally higher ambient temperature conductivities and which are based on modified PEO polymers.

According to the present invention there is provided a polymeric electrolyte comprising a solution of an ionic salt in a polymer X having a backbone of formula —A—B—, where A is an oligomeric chain and B is a chain extender group, attached to oligomer A, containing one or more linkage atoms Z selected from Si, C and P, wherein the polymer contains oxymethylene units which are present in one or more of the polymeric backbone, sidechains or crosslinks such that, where A is an oxyethylene oligomer of formula $\mathrm{+CH_2-CH_2-O\!+\!_n}$, n is an integer from 3 to 10 and where the oxyethylene oligomer is contained in a sidechain or crosslink, attached to B, n is from 2 to 25.

The linkage atoms Z in the chain extender groups B may be single atoms. The linkage atoms Z in the chain extender groups B may each link more than two units A. for example they may each link three units A in a cross linked network.

Where side groups other than units A and other than hydrogen atoms are attached to the linkage atoms Z the side groups (labelled herein as R') may be simple, for example methyl or ethyl, although they may be independently selected from $C_{1-20}$ alkyl, alkonyl or fluorine-containing alkyl or alkonyl or optionally substituted derivatives including unsaturated derivatives or $(OCH_2CH_2)_pOR^2$, where p is an integer preferably less than 25 and $R^2$ is an alkyl or alkonyl or fluorine-containing alkyl or alkonyl or optionally substituted derivatives; or may comprise other oligomers or polymeric side chains or be a chain branch in the polymer.

For example, where Z is silicon, the chain extender group B may be:

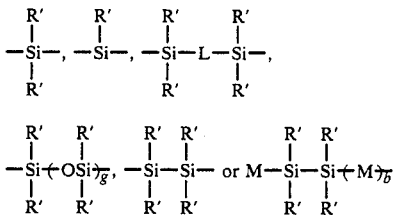

where R' is as defined above, g is an integer preferably less than 100, and L is a simple linkage group such as —O—, phenyl, alkyl, $O(CH_2CH_2O)_k$ where k is less than 12, or —ORO— where $R^3$ is alkyl or optionally substituted alkyl, and M is a simple group such as alkyl or phenyl, and b is 0 or 1.

For example where Z is carbon the chain extender group or grouping may be $C(R^4R^5)$ or $C(R^4R^5)OC(R^4R^5)$ where $R^4$ and $R^5$ are independently selected from H, alkyl, alkonyl or R' groups as previously defined.

Where Z is phosphorus for example, the chain extender group B may be selected from:

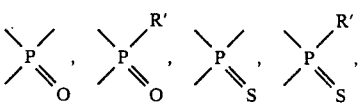

and

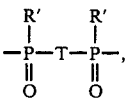

where R' is as defined previously, and T is —O—, $O(CH_2CH_2O)_t$ where t is from 1 to 12 or —$OR^6$— where $R^6$ is alkyl or optionally substituted $C_1$ to $C_{10}$ alkyl or derivatives thereof, especially fluoro-derivatives thereof.

By providing a polymer X in which the units A are linked by the relatively flexible chain extender groups B the mobility of the polymer chain is improved and, compared with polymers such as poly(ethylene oxide) used in conventional polymer electrolytes, the percentage of the polymer which is crystalline at ambient temperature is considerably reduced or essentially eliminated, thereby improving the polymer electrolyte ionic electrical conductivity at ambient temperature as compared with a polymer electrolyte made from PEO in a known manner.

Preferably, the polymer X incorporated in the electrolyte has a molecular weight of $> 10^3$, desirably $> 10^4$, preferably $> 10^5$, unless the polymer is required for blending with a second or further polymers to form the required material for use as an electrolyte, or is to be reacted with a second reactive polymer to form the required electrolyte.

If necessary the mechanical integrity of a given polymer may be improved by a conventional cross-linking agent, eg dicumyl peroxide, or benzoyl peroxide or by irradiation eg with X-rays or γ-rays after formation of the electrolyte into the desired shape. Alternatively groups capable of forming crosslinks, preferably by mutual interaction, for example by a radical coupling reaction, under stimulation by moderate heating or irradiation, possibly in the presence of an added low molecular reagent, may be incorporated by covalent attachment in the polymer structure at specific sites, preferably by being incorporated in some or all of the groups R' or R². An example of such a functional group is alkyl halide. Such stimuli may be applied to the polymer after the electrolyte has been located in the required position and formed into the desired shape. The dimensional stability of the electrolyte may be improved without necessarilly reducing the observed conductivity at any given temperature by reducing oxyalkane chain mobility.

In any event the polymer electrolyte is desirably solid (in the sense of resisting creep during cell assembly) as solids are more suitable for use in electolytic cells (in which the electrolyte is normally to be contained in the form of a sandwich between electrodes). Thus the solution of polymer X and the ionic salt is preferably a solid solution.

The ionic salt of the electrolyte is preferably the salt of an alkali metal or alkaline earth metal, although an ammonium salt or substituted ammonium salt may be used. Lithium salts are particularly preferred although Na, K, Ca or Mg salts may alternatively be used.

The anion of the salt may be any commonly used anion, preferably a relatively large anion of a strong acid, eg perchlorate (ClO−), tetrafluoroborate (BF$_4$−), hexafluorophosphate (PF$_6$−⁴), AsF$_6$−, trifluoromethanesulphonate (CF$_3$SO$_3$−), SCN, CF$_3$CO$_2$−, or I−, or B(C$_6$H$_5$)$_4$−. Alternatively or additionally anions may be covalently attached to the polymer at specific sites, and appropriate counter cations present in order to maintain the electrical conductivity. Such a situation may increase the cation transport number.

A suitable example of a group to act as a bound electrolyte is the group —CF$_2$CF$_2$SO$_3$− ionionically associated with a lithium ion. It is preferred that the bound anion forms part of a group R' or R², pendant from a linkage atom Z, except where the group R' or R² contains a group attached for the purpose of reaction to generate a crosslink as described, in which case two or more types of R' and/or R² group shall be present in the polymer.

Preferably, the concentration of the ionic salt in the electrolyte is such that the molar ratio of the ionic salt to the repeating group A$_1$ (or to the average molar mass of groups A$_1$,A$_2$ etc) in the coordinating units A of the polymer X is in the range 1:4 to 1:30.

Prior to its incorporation in the electrolyte the polymer X may be treated with a conventional endcapping reagent such as iodomethane to reduce the reactivity of any hydroxyl end groups of the polymer. A suitable proportion is 1 mole of end capping reagent to each mole of hydroxyl reactive group remaining. It may also be desirable to end-cap other residual terminal atoms, for example halogen atoms attached to the linkage atom. This could be done for example using ethanol where Z is P. These procedures improve the stability and storage life of the resulting electrolytes.

Conventional additives such as plasticisers and fillers may be added to the polymer X prior to its incorporation in the electrolyte. An example of a suitable plasticiser is poly(ethylene glycol)dimethyl ether of molecular weight 400. An example of a suitable filler is alumina or silica (including glass microspheres).

According to an important feature of the invention in the case where Z is Si the polymer X is preferably a homo- or co-polymer which is produced by the following reaction:

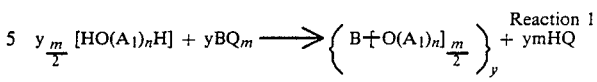

$$y_{\tfrac{m}{2}} [HO(A_1)_n H] + yBQ_m \longrightarrow \left( B + O(A_1)_n \right]_{\tfrac{m}{2}} \Big)_y + ymHQ$$

where:
y is an integer such that the product has a molecular weight of more than 1000
A$_1$ is —CH$_2$—CH$_2$—O—
n is an integer in the range preferably 3 to 10
B is the chain extending group as specified above containing a single linkage atom Si.
Q is a halogen; and
m is an integer equal to the number of units O(A$_1$)$_n$ to be linked by each chain extender group B. The integer m will normally be 2 or 3.

The halogen Q is preferably chlorine or bromine.

The electrolyte may be produced in a known way, eg by mixing the polymer and salt together and then melting them together to form a solid solution which is subsequently rolled or extruded into a thin film, or by dissolving the polymer X in a suitable solvent, eg acetonitrile or methanol, and then adding the metal salt in a suitable concentration. The solvent may subsequently be removed by evaporation on a flat surface to leave a film of the electrolyte. Spin casting of films from a solution of the electrolyte salt and polymer is also possible. further processing steps may be desirable in order, for example, to define the spatial extent of, or area covered by, the electrolyte film; this maybe important in application of microbatteries, for example in microelectronic circuitry. Here known techniques common to microelectronics manufacture may be used including methods common to resist pattering. An important feature of this invention where Z is P is the ability to decompose the electrolyte by electron beam lithography methods. Mono-, di- and tri-alkyl phosphates react by dissociative electron capture mechanisms with the rupture of either the C—O or O—P bonds. Improved definition in the patterning of the electrolyte decomposition would be expected as the number of atoms in the A components between adjacent P atoms is decreased. Here it is preferred that n, as previously defined, is less than 10.

Examples of the reagent BQ$_m$ used in Reaction 1 are as follows:
 (i) (CH$_3$)$_2$SiCl$_2$
 (ii) CH$_3$SiCl$_3$
 (iii) CH$_3$CH$_2$SiCl$_3$
 (iv) CH$_3$Si(OCH$_2$CH$_3$)$_3$
 (v) (CH$_3$)$_2$Si(OCH$_2$CH$_3$)$_2$
 (vi) +Si(CH$_3$)$_2$—O(CH$_2$.CH$_2$O)$_n$+$_y$ In the case of (ii), (iii) and (iv) the product is a cross linked network.

Preferably the hydrogen halide HQ produced in Reaction 1 is removed completely from the polymer product to maximise the molecular weight of the product and to produce an electrolyte stable in an electrolytic cell. This removal is desirably carried out continuously during the course of the reaction, eg in a known way such as by flushing the reaction mixture with argon or by the addition of a weak base such as pyridine.

Additional and important routes to the polymers of the invention include modifications of the basic reaction 1, For example reactions between BQ$_m$ and an alcohol or derivative of such or a poly(ethylene glycol), or other hydroxyl-terminated reagent may be used, for example at low temperature eg 20° C. or less, to generate alternative reagent to act as monomers in, for example, the polycondensation of Reaction 1. Thus, examples are:

$$2R'SiCl + HO(A_1)_nH \rightarrow Cl_2Si(R')O(A_1)_nSi(R')Cl_2 + 2HCl$$

Reaction 2

$$R'SiCl_3 + R'OH \rightarrow Cl_2Si(R')OR' + HCl$$

Reaction 3 where $A_1$, n and R' are as previously defined. Reaction 2 may be used as a first step in polymer formation in order to control the nature of the crosslinks formed, by variation of integer n, when the tetrachloro product is reacted with a difunctional (dichloro) monomer $BQ_m$ (m=2) and $HO(A_1)_i$ as in Reaction 1, where i is an integer with a similar range to n but may differ from n.

Reaction 3 may be used to obtain the desired side chain R' prior to the polycondensation Reaction 1. Reaction 1, 2 and 3 may be performed sequentially, in any order. Reaction 1 and 3 may be performed concurrently, For examlple, when m=2, $A_1=CH_2CH_2O$, and n=9 an oligomer with molecular weight of 2500 may be formed. This oligomer can be further reacted to form a high molecular weight polymer for use as an electrolyte or may be immobilised with a filler, particularly $\alpha$-alumina or glass microspheres, or may be end-capped and used in a blend with a second or further polymer or polymers to generate the required material, or may be reacted with a reactive pre-formed polymer to yield the required polymer.

Where the linkage group is not a simple group, for example $-Si(CH_3)-$, but is more complex, then it may be possible to prepare the grouping in situ as a first reaction step to the desired polymer. If this is possible it is preferred. Thus, for example when Z is Si an oligo siloxane may be prepared by the partial hydrolysis of an alkonylsilane and the remaining Si-alkonyl function replaced by reaction with for example a poly(ethylene glycol) or poly(ethylene glycol)monomethyl ether to generate the required polymer. Thus here only the side-chain and any crosslink oxyalkane component is expected to be cation solvating. The required chemistry for such reactions is disclosed in U.K. Pat. No. 892819. Further relavent chemistry is disclosed in "Chemistry and Technology of Silicones" W. Noll, Academic Press, 1968.

According to an important feature of the invention in the case where Z is P the polymer X is preferably a homo- or co-polymer which is produced by the following reaction:

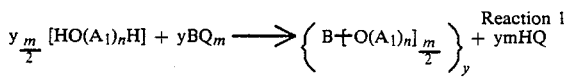
Reaction 1 where:
y is an integer
A is $CH_2-CH_2-O$
n is an integer in the range preferably 4 to 10
B is the chain extending group as specified above.
Q is a halogen; and m is an integer equal to the number of units $O(A_1)_n$ to be linked by each chain extender group B. The integer m will normally be 2 or 3.

The halogen Q is preferably Cl or Br, especially Chlorine.

Ways in which Reaction 1 can be pushed to completion by removal of the hydrogen halide, preferably chloride, including flushing the reaction mixture with an inert gas such as nitrogen or argon; conducting the reaction under reduced pressure; or by adding a base, for example pyridine, to form an insoluble hydrohalide salt.

Examples of the reagent $HO(A_1)_nH$ are the hydroxy-terminated polymers specified aboe. Poly(ethylene glycol) is preferred. This gives repeating $CH_2CH_2O$ units as the units $A_1$.

Phosphorus is selected as the linkage atom in the chain extender groups B where these are present because it provides bi- and tri-functional compounds, especially halides, suitable for introduction of the extender groups B into a polymer chain.

Examples of the reagent $BQ_m$ used in Reaction 1 are as follows:
 (i) $POCl_3$
 (ii) $PSCl_3$
 (iii) $POCl_2(OCH_3)$
 (iv) $PSCl_2(OCH_3)$
 (v) $POCl_2(OCH_2CH_3)$ For example, in the case of examples (iii) and (iv) for reagent $BQ_m$ the polymer X may contain repeating units of the formula $[PG(OCH_3)-O(CH_2CH_2O_n]_y$ where G is O or S and $A_1$ is $-CH_2CH_2O-$.

Polymers produced by reactions which are examples of Reaction 1 above are known, eg as disclosed in U.K. Pat. No. 706,410, although not for the purpose of providing polymer electrolytes. The polymer X may be made by such a known reaction, the product being treated by an end-capping reagent as mentioned above before incorporation into a polymer electrolyte.

Additional important routes to the polymers of the invention include modification of the basic reaction, Reaction 1. Low temperature reactions eg 30° C. or below between BQ and an alcohol, or a poly(ethylene glycol)monomethyl ether, or a poly(ethylene glycol) or other hydroxy-terminated reagent, may be used to generate alternative reagents to act as monomers in for example the polycondensation process of Reaction 1. Thus, examples are:

$$2POCl_3 + HO(A_1)_nH \rightarrow Cl_2P(O)O(A_1)_nP(O)Cl_2 + 2HCl$$

Reaction 2

$$POCl_3 + R'OH \rightarrow Cl_2P(O)OR' + HCl$$

Reaction 3 where $A_1$, n and R' are as defined previously. Reaction 2 may be used as a first step in polymer formation in order to control the nature of the crosslinks formed, by variation of integer n, when the tetrachloro product is reacted with a phosphorodichloridate and $HO(A_1)iH$ as in Reaction 1, where i is an integer with a similar range to but may differ from n.

Reaction 3 may be used to obtain the desired side-group R' prior to the polycondensation step.

Reactions 2 and 3 may be performed sequentially in either order, and the chemistry of related steps performed to generate phosphate ester oligomers as described in U.S. Pat. No. 4220611 and similar chemistry may be employed in this invention. Further chemistry which is appropriate to that of this invention is described by G. M. Kosolapoff, 'Organophosphorus Compounds' (1950), Chapter 9, 'Phosphates, Halophosphates and their analogs' and may be used to prepare the required electrolytes.

As described in Examples 15, 16 and 17, low molecular weight oligomeric materials generated using for example Reactions 1, 2 and 3, or combinations of such, can be used in combination with other polymers or materials in order to generate a required electrolyte material.

A further important synthetic route to the formation of polymers containing the phosphate ester group is that of ring opening polymerisation, possibly using an alkaline catalyst as described in 'Polym. Sci. USSR' 1972, 14, 730 by V. N. Sharov. A. L. Klabanokii, and V. A. Bartashev, and in 'Polym Sci. USSR', 1961, 2, 303 by K. A. Petrov, E. H. Nikant'ev and L. V. Fedorchuk. Here the ring-opening polymerisation of alkylene alkyl phosphates or fluoroalkylene fluoroalkyl phosphates is described.

An important aspect of the polymers as formed is their rubber-like properties and low observed glass transition, typically less than $-50°$ C. In this invention, for the purpose of preparing an electrolyte forming material, monocyclic phosphate ester monomers would be chosen and that the acylic group pendant from the ester contained at least one oxymethylene group , $(OCH_2CH_2)_p$ so that the side chain thus present in the final polymer should be cation coordinating.

For example, the suitable monomer is:

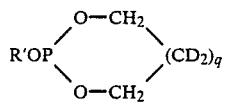

where R' is as previously defined, D is independantly selected from H or F and q is an integer, preferably less than 6. Such monomers may be copolymerised to form the desired material.

Where Z is carbon, the polymer is preferably prepared by reacting a poly(ethylene glycol) with an alkali metal hydroxide, especially KOH, and one or more organohalide compounds of formula $R_d{}^5$—C—$X_{4-d}$ where $R^5$ is hydrogen, X is a halogen and d is 0, or 1 to 3. The reaction is generally described in U.S. Pat. No. 3,951,888. For best results the glycol has an average of from 4 to 10 ethylene oxide units per molecule, d is 2 or 3, preferably 2, and X is Br. The mole ratio of glycol to organohalide is preferably from 0.9:1 to 1:0.9 in the reaction mixture in order to obtain the greatest degree of polymerisation (chain extension). Where d is 2 is product will be chain extended only and have groups B generally of formula $-\!\!\!+\!\!CH_2-\!\!O\!\!+\!\!\!-$.

Polymers produced in the above way and incorporated into polymer electrolytes can provide a film conductivity at ambient temperature of about $5 \times 10^{-5}$ S.cm$^{-1}$ is a considerable improvement over the typical conductivities, eg about $10^{-8}$ to $10^{-9}$ S.cm$^{-1}$ at ambient temperature, obtained with conventional polymer electrolyte films, eg made from polyethylene oxide and lithium salts.

Although heteroatoms have previously been incorporated in polymer chains in materials for use in electrolytes as described in U.S. Pat. No. 4,303,748, the incorporation has been carried out essentially to provide improved coordination to the cation of the ionic salt. The heteroatoms have been incorporated in the main repeating unit, not in chain extender groups. In any event, the heteroatoms used, viz nitrogen and oxygen, or unsuitable for use as chain extender linkage atoms because they do not provide suitable compounds, eg halides, permitting their introduction as such.

The conductivities obtainable at ambient temperature using the polymer electrolytes of the present invention (typically $10^{-5}$ S.cm$^{-1}$) are, in any event, considerably better than the results published in U.S. Pat. No. 4,303,748 (typically $10^{-7}$ S.cm$^{-1}$ at 20° C.

According to the present invention in a second aspect there is provided an electrolytic cell comprising an anode, a cathode and an electrolyte between the two characterised in that the electrolyte comprises a polymer electrolyte according to the first aspect of the invention.

According to present invention in a third aspect there is provided a battery comprising a plurality of cells according to the second aspect.

Electrolytic cells and batteries embodying the second and third aspects may be manufactured in known ways. They may be either primary or secondary (rechargeable) cells or batteries for a variety of uses, eg electric vehicles, computer memory back-up power sources, heart pacemakers and integrated power sources for printed circuit boards.

Batteries may be produced with the cells connected in series or in parallel (or a combination of the two) depending on whether maximum voltage or maximum current is required as an output.

As the thickness of the cells which may be produced from polymer electrolytes can be extremely small, compared with the contact surface area of the cell components, it is possible to incorporate many cells, eg up to 1000 or more, in a compact battery structure.

An embodiment of an electrolytic cell will now be described by way of example only with reference to FIG. 1, which is a cross sectional view of a polymer electrolyte cell embodying the invention;

Polymer electrolytes embodying the first aspect of the invention may be incorporated in an electrolytic cell as shown in FIG. 1. A film 1 of the polymer electrolyte is sandwiched between an anode 3 perferably of lithium metal or a lithium alloy, eg an alloy with silicon or aluminium, and a cathode 5 comprising eg TiS$_2$ preferably with an added porportion of the electrolyte. The anode 3 and cathode 5 are conventional as is the encapsulation of the cell and/or its assembly within a battery (not shown in FIG. 1). The cell may for example be made up using the techniques described in U.S. Pat. No. 4,303,748.

Figure 2:
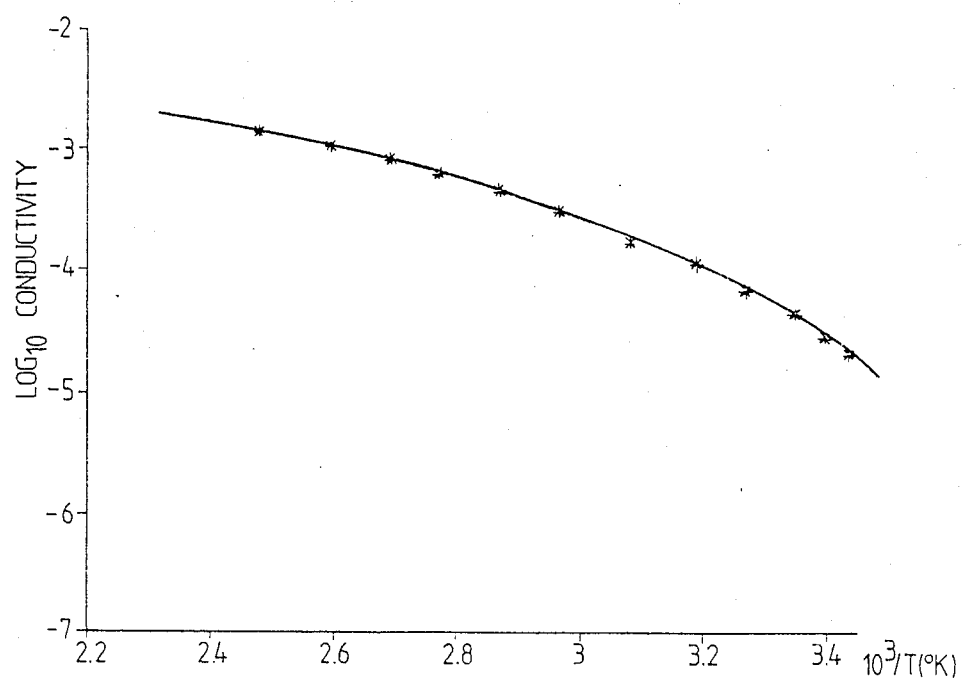
Figure 3:
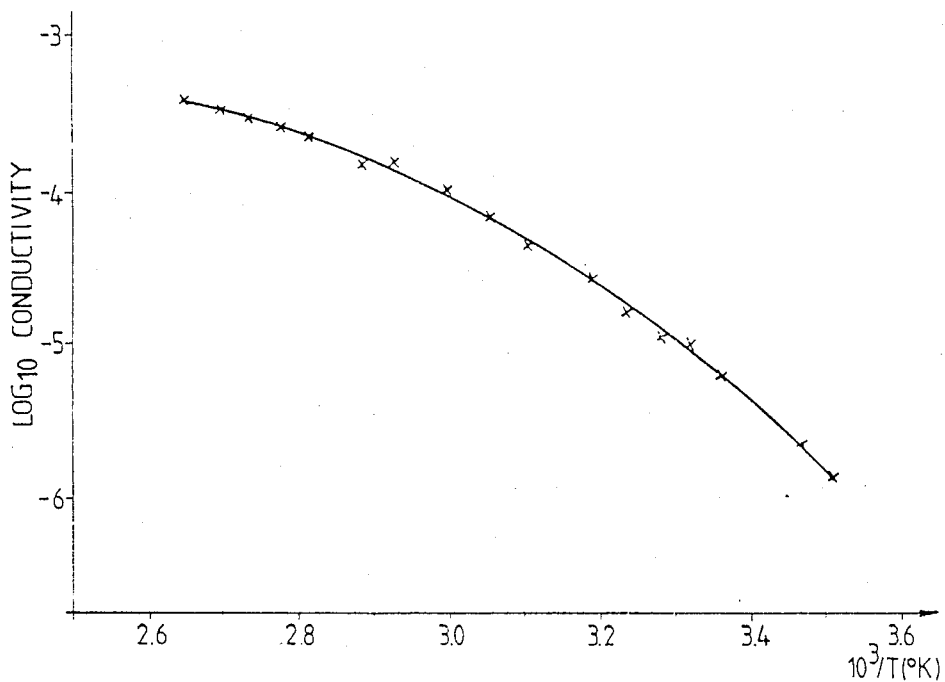
Figure 4:
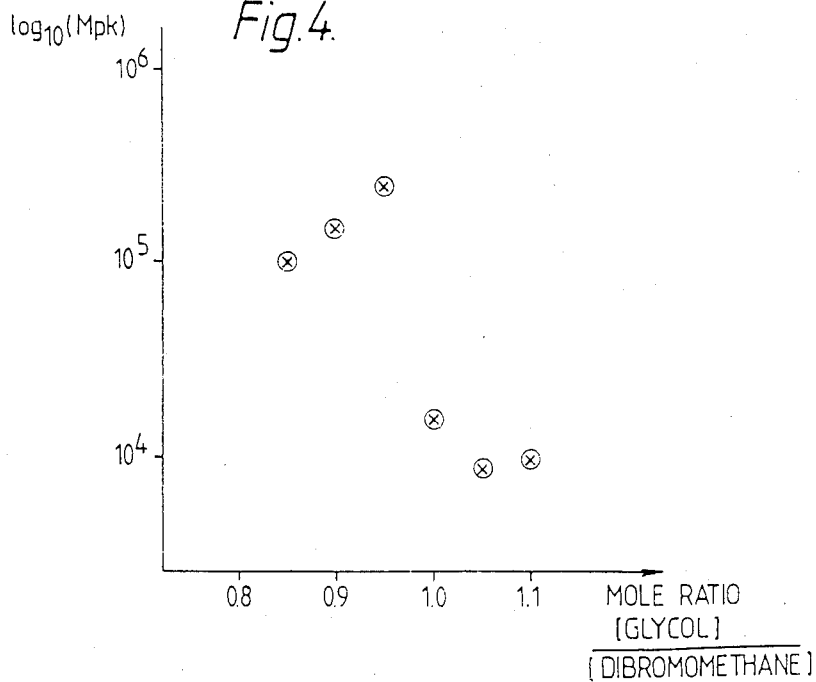

Polymeric electrolytes in accordance with the present invention will now be described by way of example only with reference to the accompanying FIGS. 2 to 4 of which FIG. 2 is an Arrhenius plot of the log$_{10}$ conductivity (expressed in 5.cm$^{-1}$) against $10^3/T$ where T is the temperature in °K. for the product of Example 1, FIG. 3 is an Arrhenius plot of the log$_{10}$ conductivity (expressed 5.cm$^{-1}$) against $10^3/T$ where T is the temperature in °K. for the product of Example 13, and FIG. 4 is a plot of log$_{10}$ (MpK) (MpK=molecular weight function) of the product of Example 6 versus

[glycol]:[dibromoethane] mole ratio in the reaction mixture used to prepare the product.

EXAMPLE 1

30 g of Poly(ethylene glycol)= of molecular weight 400, PEG 400, was placed in a 250 ml flask equipped with a magnetic stirrer and gas inlet and outlet tubes. Dry argon was passed through the inlet tube, which dipped well below the surface of the liquid. 30 ml of trichloromonomethylsilane was added over a period of 1 hour, during which time each drop of silane formed a solid-like gel on contact with the PEG. Hydrogen chloride was evolved and carried away by the gas stream. The contents of the flask consolidated during the addition until an end point was observed when excess silane collected as a separate liquid phase.

Volatile reactants and products were removed by evacuation overnight at room temperature. 200 ml acetonitrile was added and the flask was shaken to break up, and finally dissolve the product. 13.3 g of $LiCF_3SO_3$ was added with shaking of the flask. The solution was poured onto an aluminium-lined petri dish which was placed in a dry glove box to allow evaporation of the solvent under anhydrous conditions necessary for cell usage. The conductivity of the resulting transparent, rubbery film was measured to be $5 \times 10^{-5}$ S.cm$^{-1}$ at 21° C.

As the plot shown in FIG. 2 contains no "knee" it indicates that no crystalline phase was present in the polymer electrolyte over the temperature range studied. The conductivity—temperature behaviour obtained is also more desirable than comparable known PEO electrolyte in that the conductivity does not fall off so markedly at temperatures lower than 60° C., indicating a lower overall activation energy for conduction.

EXAMPLE 2

40 g PEG 400 was placed in a 3-necked flask with 15 ml pyridine. Dry argon was passed through the flask for 45 mins then 12.9 g dichlorodimethysilane was added dropwise. A white precipitate began to form as the solution increased in viscosity. Argon was passed over for an hour after complete addition and finally vacuum was applied for a further hour.

100 ml Diethylether was added, and the flask contents shaken. The pyridinium salt was allowed to settle from the ethereal solution of the polymer. The solution was evaporated to give a clear, viscous liquid.

$LiCF_3SO_3$ was added to the liquid to give a 8:1 O Li molar ratio between the polyether repeat units and lithium. 8 ml of the resultant viscous liquid was mixed with 21.1 g$\alpha$—$Al_2O_3$ (previously baked for several hours at 500° C. to remove water) and the mixture pressed into a solid pellet of 2–3 mm thickness. The solid had a conductivity of $2 \times 10^{-5}$ S.cm$^{-1}$ at 25° C.

EXAMPLE 3

30 g PEG 400 was placed in a flask of 25 cm$^3$ dichlorodimethylsilane and 5 cm$^3$ trichloromethylsilane was slowly added. During this period the viscosity of the PEG 400 increased. After pumping off residual volatiles the sample was dissolved in acetonitrile and 10.4 g $LiClO_4$ was added with stirring. The acetonitrile was pumped off to leave a viscous liquid which could be immobilized easily with-alumina filler to give a solid electrolyte of high conductivity.

EXAMPLE 4

25 cm$^3$ poly(ethylene glycol) of molecular weight 200 was mixed with 75 cm$^3$ benzene and half the original volume of benzene was distilled off in order to dry the glycol. Dichlorodimethylsilane (23 cm$^3$) was added slowly to the resulting solution maintained under an argon atmosphere. A slight molar excess of the silane was used and the reaction allowed to proceed at 50° C. The reaction solution was then refluxed for a period and the benzene and remaining volatile material removed by distillation. The product was exposed to high vacuum for 48 hours and the resulting material was a viscous liquid.

A.c. impedance measurements were performed using a liquid conductivity cell with platinum electrodes. At 22° C. the conductivity was $2 \times 10^{-5}$ S cm$^{-1}$ (lithium trifluoromethanesulphonate added, O:Li ratio=8:1). To form an electrolyte for use in a thin-film cell —$Al_2O_3$ may be added to immobilise the material.

EXAMPLE 5

Poly(ethylene glycol) of molecular weight 200 (25 cm$^3$) was mixed with 75 cm$^3$ benzene and half the benzene distilled off under an argon atmosphere in order to dry the contents of the reaction vessel. Dichlorodimethylsilane (10 cm$^3$) was added dropwise followed by trichloromethylsilane (20 cm$^3$) again added slowly. After reaction a gel was formed and little free liquid remained. All volatile material was removed under high vacuum for 48 hours to yield the required polymer.

In order to form an electrolyte film the polymer was dissolved in acetonitrile and lithium trifluoromethanesulphonate added to give an O:Li molar ratio of 8:1. A film cast from this solution and thoroughly dried under high vacuum had a conductivity of $2.8 \times 10^{-6}$ S cm$^{-1}$ at 26.5° C.

EXAMPLE 6

The preparation of oxy-methylene linked poly(ethylene glycol) of molelcular weight 400 by the reaction of the poly(ethylene glycol) with dibromomethane in the presence of potassium hydroxide.

Finely ground potassium hydroxide (21 g), chlorobenzene (100 cm$^3$) and dibromomethane (1.245 g) were mixed in the dark at room temperature under nitrogen. Polyethylene glycol 400 (2.574 g) in chlorobenzene (30 cm$^3$) was added slowly (0.25 h) from a dropping funnel, followed by chlorobenzene washings to a total volume of 250 cm$^3$, and the mixture stirred in the dark at room temperature under nitrogen (16 h). This mixture was filtered and the filtrate rotary evaoporated under vacuum at room temperature. The white gum (ca 4 g, including some solvent) was dissolved in dichloromethane (50 cm$^3$) and washed with sodium carbonate solution (2×25 cm$^3$, 10% wt/vol) and with distilled water until neutral before drying with anhydrous calcium sulphate. The organic layer was rotary evaporated under vacuum at 40°-50° C. to obtain a white gum (ca 2 g).

Gel permeation chromatography (GPC) in tetrahydrofuran (THF) was used to show that the product consisted of roughly equal proportions of high polymer and material of low molar mass. Accordingly it was dissolved in toluene (ca 0.03% wt/vol) and heptane was added slowly to the stirred solution until the high polymer precipitated, at a heptane concentration of ca 30%-vol. The liquid phase was decanted off and the residue was dried (<10 mbar, 20° C., >12 h) to constant weight.

The product was finally characterised by use of gel permeation chromatography. Styragel columns with dimethylacetamide solvent were calibrated with poly(ethylene oxide) standards.

The mole ratio of polyethylene glycol to dibromomethane was varied about unity in order to obtain the highest weight average molar mass of polymer. FIG. 4 shows that values close to 0.96 are preferred, resulting in an amorphous rubbery polymer having a weight average modecular weight of 115,000 and a melting point of 14° C.

EXAMPLE 7

A.c. impedance measurements were performed on films of the polymer prepared by the reaction described in Example 6. The polymer was dissolved in acetonitrile and lithium trifluoromethane sulphonate added to give an O:Li molar ratio of 8:1. A film was cast from the solution and residual solvent removed under high vacuum. Further manipulations were carried out under dry conditions and the conductivity of the film at 20° C. was $2 \times 10^{-6}$ S cm$^{-1}$.

EXAMPLE 8

The polymer described in Example 6 was treated similarly to the manupulations given in Example 7 except that the electrolyte salt was added to give an O:Li ratio of 16:1 and thoroughly dried $\alpha$—Al$_2$O$_3$ was incorporated into the film to the extent of 50% v/v to improve the mechanical stability. The conductivity of the resulting film was $3.7 \times 10^{-5}$ S cm$^{-1}$ at 24° C.

EXAMPLE 9

The preparation of methylene intended poly(ethylene glycol) of molecular weight 200 by reaction of the glycol with dibromomethane was carried out by the method of Example 6. A product with a weight average molar mass 48,000 obtained after fractionation was examined by a.c. impedance methods as follows. The polymer was complexed with lithium trifluoromethane sulphonate resulting in an O/Li ratio of 13.7 by casting a film from a solution in acetonitrile of the polymer and salt. At 23° C. a conductivity of $4 \times 10^{-6}$ S cm$^{-1}$ was recorded. As with other examples dried —Al$_2$O$_3$ may be incorporated in the electrolyte to improve mechanical stability.

EXAMPLE 10

Poly(ethylene glycol) of molecular weight 400 (10 g) was dried by azeotropic distillation using benzene (50 cm$^3$) and 15 cm$^3$ of liquid was collected. A dry nitrogen gas atmosphere was maintained throughout the preparation. To the stirred glycol solution at 25° C. ethyl trichlorosilane (2.73 g) was added dropwise and the solution, with nitrogen gas bubbled through the solution, was stirred at 25° C. for in excess of 15 hours. The solution viscosity increased markedly during the latter stages. All volotile components were removed under vacuum and the product obtained was a colourless, rubbery gel. A salt complex was prepared by the partition of lithium trifluoromethane sulphonate (0.1135 g) between acetonitrile (3 cm$^3$) and the gel (0.353 g) well swollen by the solution. The gelatinous mass formed was transferred to the lower electrode of a conductivity cell and dried under high vacuum. After pressing a film of the electrolyte in situ between the steel blocking electrodes a conductivity of $1.1 \times 10^{-5}$ S cm$^{-1}$ at 28° C. was recorded.

EXAMPLE 11

Poly(ethylene glycol) (20.0 g, 0.1 mol) of molecular weight 200, under a nitrogen atmosphere, was azeotropically distilled with benzene (50 cm$^3$) in order to dry the glycol and 10 cm$^3$ of liquid was collected. The resulting stirred solution was cooled at 5° C., and dimethyl dichlorosilane (13.55 g, 0.105 mol) was added dropwise stirred for 12 hours during which time the temperature was allowed to rise to 25° C. The reaction mixture was stirred for a further 4 days and finally remaining solvent was removed under vacuum. At this stage the higher molecular weight material could be concentrated by fractional precipitation. The linear chain oligomer formed was a colourless viscous oil.

A portion of the product was disolved in benzene under a nitrogen atmosphere and ethyl trichlorosilane added in order to form a crosslinked gel. After a period of initial stirring and then reflux a colourless gelled product, soluble in acetonitrile, would be isolated in the usual manner.

EXAMPLE 11 (Original)

Si veroin

This product was reacted with trimethylchlorosilane in order to end-cap residual hydroxyl functions present in the polymer. The material isolated was a colourless gel.

A conductivity of greater than $7 \times 10^{-5}$ S cm$^{-1}$ at 25° C. was obtained.

EXAMPLE 12

Use of 1,3-bis bromomethyl tetramethyl disiloxane to form an oligomer by reaction with poly(ethylene glycol). The product is less suseptible to hydrolysis as it does not contain any Si—O—C linkages.

Poly(ethylene glycol) (6.339 g) of molecular weight 400 was dried by azeotropic distillation with toluene (40 cm$^3$) under a nitrogen atmosphere. To the resulting cooled solution, 5.07 g of 1,3-bis(bromomethyl)tetramethyldisiloxane was added dropwise and the mixture raised to reflux. Pyridine (2.5 g) was added dropwise, over a period of 30 minutes, to the refluxing reaction mixture. As reaction proceded a red-brown colouration and solid hydrobromide product appeared. The reaction was allowed to continue at reflux for 3 hours after the final addition and an increase in solution viscosity was apparent over this period. The mixture was left at 25° C. for 15 hours and the hydrobromide product filtered from the resultant solution. After evaporation of the solvent a colourless oil remained. The higher molar mass product was concentrated by fractional precipitation from toluene by the addition of hexane, to yield a viscous, colourless clear oil.

EXAMPLE 13

20 g of poly(ethylene glycol) of melecular weight 400 was azeotropically dried using 50 cm$^3$ of benzene. During the process 10 cm$^3$ of benzene-water was collected.

To the resulting stirred solution 5.1 g of phosphoryl chloride in 10 cm$^3$ of dry benzene was added dropwise from a dropping funnel equipped with a drying tube. A dry atmosphere was maintained by passing nitrogen gas through the reaction solution. This also served to drive off the hydrogen chloride formed by the reaction. The addition of phosphoryl chloride took 1 hour and the mixture formed was refluxed for a further 4 hours. During this latter period the benzene solvent was evaporated from the reaction vessel. The product was a colourless rubbery polymeric solid, which was broken up and washed with ethanol. The material was dried under reduced pressure and handled under nitrogen.

The polymer was transferred to a glove-box and 0.2 g of the material was soaked with a solution of 3 cm$^3$ acetone containing 65 mg lithium trifluoromethane sulphonate for several hours. The gelatinous mass formed was transferred to the lower electrode of a conductivity cell and dried under reduced pressure for in excess of 14 hours. The conductivity of the resulting film formed after pressing between the stainless steel electrodes was $4 \times 10^{-6}$ S cm$^{-1}$.

As the figure shows there is no 'knee' in the plot indicating that no crystalline phase was present in the electrolyte film in the temperature range studied. A desirable, lower activation energy, than in comparison with similar PEO electrolytes, may be deduced from the figure and thus the conductivity does not decline as rapidly when the temperature is reduced from 60° C.

EXAMPLE 14

A solid polymeric electrolyte was prepared in a similar manner to Example 13.

Phosphoryl chloride (5.1 g, 0.033 mole) was stirred in 50 cm$^3$ of hexane under nitrogen and heated to reflux. Poly(ethylene glycol) molecular weight 480 (20 g, 0.05 mole) was added dropwise and the mixture stirred under reflux for 20 hours. During this period the solvent was evaporated off and the product formed was a colourless rubber.

EXAMPLE 15

20 g of poly(ethylene glycol) with molecular weight 400 was azeotropically dried using benzene (50 cm$^3$) during which 10 cm$^3$ of liquid distilled. Phosphoryl chloride (5.1 g) in benzene (10 cm$^3$) was added dropwise to the stirred solution of the gylcol from a dropping funnel, under dry conditions. When the addition was complete the reaction mixture was stirred under reflux for 4 hours after which the polymeric product felled out of solution. The mixture was allowed to cool and methanol (50 cm$^3$) was added. After partial esterification and transesterification the product was dried under high vacuum to yield a low molecular weight oil. Gel permeation chromatography showed that the product had a number average molecular weight (Mu) of 2150. Fractional precipitation from solution may be used to concentrate the higher molecular weight material. A filler such as $\alpha$—Al$_2$O$_3$ may be used to immobilise the material, after addition of an ionic salt, to form an electrolyte. Alternatively the product may be blended with a second polymeric electrolyte to form the desired electrolyte for inclusion in a cell.

EXAMPLE 16

A weighed 250 cm$^3$ flask was charged with poly(ethylene glycol) of molecular weight 400 (41.3 g) and then heated with stirring under vacuum to 120° C. over an extended period. After cooling the flask was re-weighed in order to determine the mass of dried glycol present. The resultant glycol (41.09 g, 0.1061 mol) was stirred with azeotropically dried benzene (70 cm$^3$) under a nitrogen atmosphere while a mixture of ethyl phosphorodichloridate (16.83 g, 0.1033 mol) and phosphoryl chloride (0.32 g, 0.0021 mol) in dried benzene (20 cm$^3$) was added dropwise during 30 minutes. The temperature was maintained just below 30° C. throughout the addition and then the reaction mixture was refluxed for 2.5 hours. The mixture was allowed to cool and volatile components were removed by application of a high vacuum, finally extended for 14 hours while the product was maintained at 60° C. 0.369 g of the resultant oil were mined with 0.093 g of lithium trifluoromethane sulphonate and 3 cm$^3$ of dry acetone. An electrolyte film was cast on to the lower of a pair of steel blocking electrodes using the prepared solution. The film was pressed between the elctrodes and a.c. impedance methods used to determine conductivity: at 24° C. a value of $2 \times 10^{-5}$ S cm$^{-1}$ was recorded. The product here may be similarly treated as given in Example 15 and may be blended with a second polymeric electrolyte or strengthened with a finely divided filler or further reacted or crosslinked or reacted with a preformed to form a higher polymer, molecular weight material for use as an electrolyte.

EXAMPLE 17

Poly(ethylene glycol) of molecular weight 400 (20 g, 0.05 mol) was dried by azeotropic distillation using benzene (50 cm$^3$) and 15 cm$^3$ of liquid was collected. Ethyl phosphorodichloridate (7.34 g, 0.05 mol) was added at 25° C. to the glycol solution over a period of 15 minutes and a nitrogen atmosphere was maintained throughout. The resultant solution at 25° C. with a slow stream of nitrogen gas passed through the mixture was stirred for 2 hours and subsequently refluxed for a further 2 hours. At this stage a low molecular weight linear chain oligomar could be isolated from the reaction mixture. This product may be further reacted, for example as described below to form a high molecular weight colourless oil or solid gelled polymer or may be reacted with a reactive preformed polymer to give a salt solvating product or may be blended with another salt solvating polymer for example poly (ethylene oxide to form a desired electrolyte.

To the reaction solution formed as above phosphoryl chloride (0.0098 mol, 0.2 molar ration with the starting glycol content) was added and the solution refluxed under nitrogen for 45 minutes and then allowed to cool. After stirring the mixture overnight an alignot was removed. The isolated solution was evaporated down and dried under high vacuum to yield a viscous colourless oil. At this state electrolyte salt could be added and dissolved in the oil and the resultant solution cast into a mould and left to stand. After further reaction in the mould a solid transparent rubber is formed for use as a thin-film electrolyte. Alternatively the electrolyte salt may be added to the rubber formed, by partition from a solution of the salt in a solvent for example, acetune known to swell the crosslinked matrix, as described later in this example.

The remaining original reaction solution, left after stirring overnight was heated to between 65° and 70° C. for 1 hour. Again an alignot was removed, the solvent removed and the oil remaining cast into a mould. Now formation of the transparent, colourless rubbery thin-film occurred more rapidly. Again electrolyte salt may be added to the polymer either prior to solidification or by partition, as described here. To 0.209 g of the rubber 0.065 g of lithium trifluoromethane sulphonate and 3 cm$^3$ of dried acetone were added. The swollen gel formed was transferred to the lower electrode of a conductivity cell and dried under reduced pressure for in excess of 14 hours. A film was then pressed between the steel electrodes and examined by a.c. impedance methods. At 27° C. a conductivity of $9.3 \times 10^{-6}$ S cm$^{-1}$ was recorded.

After heating the original reaction solution to 65°–70° C. for 1 hour the temperature was raised to 85° C. and heating continued for 2.5 hours at which point the solution became highly viscous just prior to gel formation. At this point heating was stopped and the volatile components were stripped off under high vacuum for in excess of 24 hours. The product was a colourless, semi-transparent gel.

This example demonstrates how it is possible to control the physica physical form and degree of polymertsation of the polymer by controlling the reactant ratios, the reaction time and temperature.

Part of the gelled product isolated was washed with excess dried ethanol under a nitrogen atmosphere for 15 minutes. Subsequently the volatile material was removed under high vacuum for an extended period. The product remaining was a colourless viscous oil. This material may be used in a similar way to that finally generated in Example 15 and may be purified by fractional precipitation.

EXAMPLE 18

A gelled colourless polymeric phosphate ester was prepared by a route similar to that described in Example 13, from the reaction of 20 g poly(ethylene glycol) of molecular weight 400 with phosphoryl chloride (5.1 g), with nitrogen gas passed through the refluxed reaction solution, and benzene as solvent. The product was dried under high vacuum. 0.281 g of the product was mixed with 0.104 g of sodium trifluoromethane sulphonate and 3 cm$^3$ of acetone. After partition of the salt the gelatinous material was transferred to the lower electrode of a conductivity cell dried under high vacuum. A film 600 μm thick was pressed between steel blocking electrodes and the conductivity examined by a.c. impedance methods. At 20° C. the conductivity was $1.1 \times 10^{-6}$ S cm$^{-1}$; at 60° C. the conductivity was $5.0 \times 10^{-5}$ S cm$^{-1}$.

EXAMPLE 19

Poly(ethylene glycol) (30 g) of molecular weight 200 was dried by azeotropic distillation with benzene (60 cm$^3$) and 20 cm$^3$ of liquid was collected. A mixture of silanes [(3-chloropropyl)methyldichlorosilane (0.1 mol) and dimethyldichlorosilane (0.05 mol)] was added dropwise to the glycol solution, stirred under a nitrogen atmosphere at approximately 10° C. Stirring was continued for 4 hours. The temperature was allowed to rise to about 30° C. and this was maintained for in excess of 15 hours. A further increase in temperature to 55° C. for 4.5 hours followed, after which the solvent was evaporated off. The viscous, colourless oily product was dried under high vacuum.

EXAMPLE 20

Dimethyl diethoxysilane was reacted with poly(ethylene glycol) (12.5 g) of molecular weight 200 in a 1 to 1 molar ratio in the presence of an acid catalyst, trifluoromethanesulphonic acid (0.1% by mass of starting materials) at 25° C. under a nitrogen atmosphere in toluene solution (50 cm$^3$). The reaction mixture was stirred for in excess of 12 hours, after which the temperature was increased to allow reflux for 2 hours. 10 cm$^3$ of liquid was removed by slow distillation over a period of 4 hours. A further period of stirring at 25° C. was followed by removal of the solvent under vacuum. The oligomeric product was dried at approximately 50° C. under vacuum. Finally a viscous, colourless oil was isolated. This material may be further reacted as given in Example to form the required electrolyte.

We claim:

1. A polymeric electrolyte characterized in that it comprises a solution of an ionic salt in a polymer X having a backbone of formula —A—B—, where A is an oligomeric chain and B is a chain extender group attached to oligomer A, containing one or more linkage atoms Z selected from the class consisting of silicon, carbon present as one or more —CH$_2$O— groups, and phosphorus present as one or more =PO or =P(R$^1$)O groups where R$^1$ is C$_{1\text{-}20}$ alkyl, wherein the polymer contains units which are present in one or more of the polymeric backbone, sidechains or crosslinks, such that, when A is an oxyethylene oligomer of formula $-(-CH_2CH_2O-)_{\overline{n}}$ n is an integer from 3 to 10, and where the oxyethylene oligomer is contained in a sidechain or crosslink attached at B, n is an integer from 2 to 25.

2. A polymeric electrolyte as claimed in claim 1 characterized in that A in the polymer backbone is $-(-CH_2CH_2O-)_{\overline{n}}$ where n is an integer from 3 to 10 and B is as defined in claim 1.

3. A polymeric electrolyte as claimed in claim 1 characterized in that the polymer is crosslinked by a group comprising —A—B)$_x$A— where x is an integer.

4. A polymeric electrolyte according to claim 1 characterized in that the average value of n is from 3 to 10.

5. A polymeric electrolyte as claimed in claim 1 characterized in that the number of units —A—B— in each molecule of polymer is on average more than 3.

6. A polymeric electrolyte as claimed in claim 1, characterized in that the polymer has an average molecular weight of more than 1000.

7. A polymeric electrolyte as claimed in claim 6 characterized in that the polymer has an average molecular weight of more than 10,000.

8. A polymeric electrolyte according to claim 7 characterized in that the polymer has an average molecular weight of more than 100,000.

9. A polymeric electrolyte according to claim 1 characterized in that B contains at least one oxygen linking atom.

10. A polymeric electrolyte as claimed in claim 9 characterized in that Z is Si and at least one of the groups B in each polymer chain is of the formula —(—Si(CH$_3$)$_2$—O—)— or —(Si(CH$_2$CH$_3$)—O—)—.

11. A polymeric electrolyte as claimed in claim 10 characterized in that the average value of n is 3 or greater, but less than 5.7.

12. A polymeric electrolyte as claimed in claim 10 or 11, wherein the polymer X is a reaction product of poly (ethylene glycol) ("PEG") and trichloromonomethylsilane.

13. A polymeric electrolyte as claimed in claim 10 or 11, wherein the polymer X is a reaction product of PEG and dichlorodimethylsilane.

14. A polymeric electrolyte as claimed in claim 10 or 11, wherein the polymer X is a reaction product of PEG, dichlorodimethylailane and trichloromonomethylsilane.

15. A polymeric electrolyte as claimed in claim 1 wherein the polymer X is a reaction product of PEG and dibromomethane.

16. A polymeric electrolyte as claimed in claim 1 wherein the polymer X is a reaction product of PEG and phosphoryl chloride or ethyl phosphoro-dichloridate.

17. A polymeric electrolyte as claimed in claim 1 characterized in that the molar ratio of the ionic salt to the groups —($CH_2CH_2O$)— in the electrolyte is from 1:4 to 1:30.

18. A polymeric electrolyte as claimed in claim 1 characterized in that the cation of the ionic salt is selected from the group consisting of $Li^+$, $Na^+$, $Ca^{2+}$, $NH_4^+$, $Mg^{2+}$, and the anion of the ionic salt is selected from the group consisting of $I^-$, $ClO_4^-$, $BF_4^-$, $AsF_6^-$, $PF_6^-$, $SCN^-$, $CF_3SO_3^-$, $CF_3CO_2^-$, $CF_3CF_2COO^-$, $CF_3(CF_2)_6SO_3^-$, and $BJ_4^-$ where J is $C_6H_5$, an alkyl chain or an aryl group.

19. An electrolytic cell comprising an anode, a cathode, and a polymeric electrolyte between the anode and the cathode, wherein the electrolyte comprises a polymeric electrolyte as claimed in claim 1.

* * * * *